US012726350B2

(12) United States Patent
Zhang et al.

(10) Patent No.: US 12,726,350 B2
(45) Date of Patent: Sep. 1, 2026

(54) ZERO-TRUST REMOTE ATTESTATION SERVICE DEPLOYMENT SYSTEM BASED ON CONFIDENTIAL VIRTUAL MACHINE

(71) Applicant: Nanhu Laboratory, Jiaxing (CN)

(72) Inventors: Lei Zhang, Jiaxing (CN); Zhichao Yan, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 19/207,455

(22) Filed: May 14, 2025

(65) Prior Publication Data

US 2025/0365147 A1 Nov. 27, 2025

(30) Foreign Application Priority Data

May 14, 2024 (CN) ........................ 202410591799.X

(51) Int. Cl.
*H04L 9/08* (2006.01)
*G06F 9/455* (2018.01)

(52) U.S. Cl.
CPC ........ *H04L 9/0894* (2013.01); *G06F 9/45558* (2013.01); *H04L 9/0861* (2013.01); *G06F 2009/45587* (2013.01)

(58) Field of Classification Search
CPC ... H04L 9/0894; H04L 9/0861; H04L 9/0869; H04L 9/3247; G06F 9/45558; G06F 2009/45587; G06F 21/44; G06F 21/45; G06F 21/602
See application file for complete search history.

(56) References Cited

U.S. PATENT DOCUMENTS

| | | | | |
|---|---|---|---|---|
| 9,864,874 | B1 * | 1/2018 | Shanbhag | H04L 63/10 |
| 10,423,774 | B1 * | 9/2019 | Zelenov | H04L 63/126 |
| 10,484,297 | B1 * | 11/2019 | McClenahan | G06F 11/2048 |
| 10,764,036 | B1 * | 9/2020 | Griffin | H04L 63/06 |
| 11,088,996 | B1 * | 8/2021 | Spector | H04L 63/0421 |
| 11,101,984 | B2 * | 8/2021 | Duval | H04L 9/3263 |
| 11,363,012 | B1 * | 6/2022 | Chhabra | H04L 9/0894 |
| 12,010,227 | B1 * | 6/2024 | Chhabra | G06F 9/45558 |
| 12,067,119 | B1 * | 8/2024 | Brandwine | G06F 9/45558 |
| 12,197,563 | B2 * | 1/2025 | Sovio | G06F 21/53 |
| 12,518,043 | B2 * | 1/2026 | Friedman | G06F 21/6218 |
| 12,519,835 | B2 * | 1/2026 | Sood | H04L 63/20 |
| 2003/0159057 | A1 * | 8/2003 | Mangold | G06F 21/10 713/193 |

(Continued)

*Primary Examiner* — Aravind K Moorthy
(74) *Attorney, Agent, or Firm* — Bayramoglu Law Offices LLC

(57) ABSTRACT

A zero-trust remote attestation service deployment system based on a confidential virtual machine (CVM) includes a trusted execution environment (TEE), a key management component, and an application service virtual machine. Leveraging the TEE technology, both application execution and storage are protected in a zero-trust state. The key management component runs in the TEE, while a service application runs in the CVM. Encryption keys of the CVM are securely stored and efficiently accessed through the TEE technology and the proposed key management component, as well as operational methods. This system enables a zero-trust service and effectively mitigates the risk of sensitive data theft caused by malicious software through memory scraping or code operation logic tampering.

16 Claims, 6 Drawing Sheets

(56) References Cited

U.S. PATENT DOCUMENTS

2008/0250406 A1* 10/2008 Carpenter ............... G06F 21/53 718/1
2010/0098256 A1* 4/2010 Kirshenbaum ....... H04L 9/0894 380/277
2013/0086383 A1* 4/2013 Galvao de Andrade .................... G06F 21/57 713/171
2013/0091498 A1* 4/2013 Arcese .................... G06F 9/455 717/173
2014/0089658 A1* 3/2014 Raghuram .......... G06F 9/45533 380/278
2015/0172260 A1* 6/2015 Brenner ................ H04L 63/061 713/171
2016/0171248 A1* 6/2016 Nesher .................... G06F 21/53 713/190
2017/0270301 A1* 9/2017 Vidyadhara ........... G06F 9/4411
2018/0332078 A1* 11/2018 Kumar ................ H04L 63/0815
2018/0342111 A1* 11/2018 Fan ......................... A63F 13/65
2019/0004843 A1* 1/2019 Durham .............. H04L 63/0471
2019/0007378 A1* 1/2019 Jowett ................. G06F 9/45558
2019/0102323 A1* 4/2019 Durham .............. G06F 9/45558
2019/0171379 A1* 6/2019 Van Riel ............... G06F 3/0643
2019/0213346 A1* 7/2019 Friedman ............ G06F 21/6218
2019/0215160 A1* 7/2019 Lasko ................... G06F 21/602
2019/0260718 A1* 8/2019 Buendgen ............. H04L 9/0822
2019/0373472 A1* 12/2019 Smith ..................... H04W 4/38
2020/0019425 A1* 1/2020 Toy ......................... H04L 43/20
2020/0204530 A1* 6/2020 Kumar .................... H04L 63/06
2020/0249972 A1* 8/2020 Toy ......................... G06F 9/545
2021/0273812 A1* 9/2021 Hardin .................. H04L 9/0894
2021/0311643 A1* 10/2021 Shanbhogue ......... G06F 3/0622
2022/0012369 A1* 1/2022 Constable ............... G06F 21/53
2022/0014507 A1* 1/2022 Hawkins ............. H04L 63/1416
2022/0035904 A1* 2/2022 Bursell ................... H04L 63/10
2022/0121470 A1* 4/2022 Saxena ................... H04L 63/20
2022/0121502 A1* 4/2022 Schmitt ................. G06F 9/5083
2022/0188385 A1* 6/2022 Ganesan ............... G06F 21/105
2022/0206961 A1* 6/2022 Lempel ............... G06F 12/0835
2022/0222100 A1* 7/2022 Srivastava ............ G06F 9/5077
2022/0329573 A1* 10/2022 Sood ..................... H04L 63/166
2022/0391488 A1* 12/2022 Rooyakkers .......... H04L 9/3263
2022/0414223 A1* 12/2022 Liu ....................... G06F 21/606
2023/0020169 A1* 1/2023 Mokhtar ............... H04L 67/104
2023/0030816 A1* 2/2023 Bursell ................... G06F 21/57
2023/0034725 A1* 2/2023 Bursell ............... H04L 63/1433
2023/0048343 A1* 2/2023 Hullahalli ........... G06F 21/6281
2023/0106581 A1* 4/2023 Sood ..................... H04L 63/166 709/203
2023/0128578 A1* 4/2023 Lenrow ................. H04W 12/08 455/411
2023/0155984 A1* 5/2023 Adam ................... H04L 63/105 726/26
2023/0168911 A1* 6/2023 Lopez Pascual ... G06F 9/45558 718/1
2023/0229778 A1* 7/2023 Terpstra .................. G06F 21/73 713/2
2023/0267196 A1* 8/2023 Pismenny ............ G06F 9/5016 726/26
2023/0274034 A1* 8/2023 Melara .................... G06F 21/57 726/17
2023/0289204 A1* 9/2023 Ismael .................... H04L 63/20
2023/0292127 A1* 9/2023 Raghavan ............. H04W 12/08
2023/0297664 A1* 9/2023 Soryal ................... H04L 63/061 726/6
2023/0297666 A1* 9/2023 Atamli .................... G06F 21/53 726/23
2023/0299968 A1* 9/2023 Dyrba ..................... H04L 9/088 713/189
2023/0325531 A1* 10/2023 Kalavala ............ G06Q 30/0631 726/28
2023/0359747 A1* 11/2023 Singh ...................... G06F 21/78
2023/0376416 A1* 11/2023 Fang ................... G06F 12/0802
2024/0022401 A1* 1/2024 Bursell ................. G06F 21/602
2024/0022550 A1* 1/2024 Raghuram ............ H04L 63/062
2024/0022609 A1* 1/2024 Smith ..................... H04L 63/20
2024/0069889 A1* 2/2024 Choi ..................... H04L 9/3239
2024/0086550 A1* 3/2024 Tamir .................... G06F 21/602
2024/0143765 A1* 5/2024 Jungerman ........... H04L 9/3242
2024/0154809 A1* 5/2024 Furusawa ............. H04L 9/0825
2024/0220417 A1* 7/2024 Kaplan ............... G06F 12/1036
2024/0220639 A1* 7/2024 Sahu ..................... G06F 21/602
2024/0241958 A1* 7/2024 Marek ................... G06F 21/575
2024/0291815 A1* 8/2024 Pascual ............... H04L 63/0435
2024/0348589 A1* 10/2024 Chen ....................... H04L 63/08
2024/0372701 A1* 11/2024 Raghuram ............ H04L 9/3255
2024/0380610 A1* 11/2024 Andre ................. H04L 63/0823
2024/0427908 A1* 12/2024 Huo ........................ G06F 21/53
2025/0005196 A1* 1/2025 Chalk ................... G06F 21/602
2025/0023731 A1* 1/2025 Goodman ............... H04L 9/321
2025/0023736 A1* 1/2025 Cambou ............... H04L 9/3236
2025/0036751 A1* 1/2025 Xing ................... G06F 9/30145
2025/0061186 A1* 2/2025 Sharma ................. H04L 9/3247
2025/0094601 A1* 3/2025 Kar .......................... G06F 21/57
2025/0131080 A1* 4/2025 Ramaiah ............. G06F 9/45558
2025/0190235 A1* 6/2025 Dupont de Dinechin ................... G06F 9/45558
2025/0202941 A1* 6/2025 Robison .................. H04L 63/20
2025/0254207 A1* 8/2025 Chen ..................... H04L 9/0894
2025/0310316 A1* 10/2025 Ligman ................. H04L 63/083
2025/0365144 A1* 11/2025 Mitchell ................. H04L 9/088

* cited by examiner

ZERO-TRUST REMOTE ATTESTATION SERVICE DEPLOYMENT SYSTEM BASED ON CONFIDENTIAL VIRTUAL MACHINE

CROSS REFERENCE TO THE RELATED APPLICATIONS

This application is based upon and claims priority to Chinese Patent Application No. 202410591799.X, filed on May 14, 2024, the entire contents of which are incorporated herein by reference.

TECHNICAL FIELD

The present disclosure relates to the field of information security computing technology, and in particular, to a zero-trust remote attestation service deployment system based on a confidential virtual machine (CVM).

BACKGROUND

Confidential virtual machine (CVM) is a secure virtual machine technology designed to protect the confidentiality and integrity of both data and code running within a virtual machine. CVM leverages hardware-supported security technologies, such as Intel Trust Domain Extensions (TDX) or Hygon Cloud Security Virtualization (CSV), to provide hardware-level isolation and encryption for virtual machines. Key features include:

1) Memory encryption: The memory of the virtual machine is encrypted at the hardware level, to prevent the host operating system or other virtual machines from accessing the memory data.
2) Remote attestation: The virtual machine can prove the integrity of an runtime environment to a remote party, ensuring that code is executed in a trusted environment.
3) Sealed storage: Sensitive data can be sealed and bound to a specific virtual machine environment, preventing decryption in other environments.
4) Hardware isolation: The virtual machine is isolated from the host operating system and other virtual machines at the hardware level, reducing the risk of attacks or data leaks.

Thanks to these features, CVMs are increasingly becoming the primary deployment environment for confidential computing applications.

Remote attestation plays a critical role in confidential computing and is widely applied in various application scenarios of confidential computing. For instance, in confidential computing-based multi-party data fusion scenarios, where CVMs serve as the main deployment environment, each data provider needs to verify the authenticity of the fusion platform via remote attestation before authorizing data sharing. Similarly, in trustworthy artificial intelligence (AI) scenarios, the owner of an AI model needs to verify the security of an inference platform before releasing keys to the platform for model decryption.

As the key mechanism for releasing sensitive information when users use confidential computing, remote attestation directly impacts application security. If the remote attestation service is compromised, the security of sensitive data is directly impacted. However, due to the lack of robust application-level measurement mechanisms and sealed data storage systems, CVMs often rely on a manually trusted party to manage encryption keys or account information during deployment of applications such as remote attestation. This reliance prevents zero-trust application deployment and makes CVMs unsuitable for confidential computing application scenarios such as secure data fusion among mutually untrusted parties.

SUMMARY

To address the above-mentioned problems, the present disclosure provides a zero-trust application execution environment that enables secure and reliable operation of applications under full-state encryption, without relying on a system administrator or any other third party. It ensures the integrity, authenticity, and confidentiality during application runtime, as well as confidentiality of persistent data. Specifically, the present disclosure proposes a zero-trust remote attestation service deployment system based on a CVM.

A zero-trust remote attestation service deployment system based on a CVM includes: a trusted execution environment (TEE), a key management component, and an application service virtual machine, where the application service virtual machine is configured to provide a zero-trust application service by utilizing the TEE and the key management component, and an implementation method thereof includes:

- verifying, by a virtual machine agent, trustworthiness of the key management component running in the TEE;
- upon successful verification, generating a key tkey, and associating the key tkey with an access key of the application service, where the tkey is directly used to encrypt and store the access key of the service, or is combined with other parameters to derive a new key for encrypting and storing the access key of the service;
- encrypting, by the virtual machine agent, the key tkey using a public key P1 of the key management component to obtain e-tkey;
- providing, by the virtual machine agent, a virtual machine unique identifier uuid and the e-tkey to the key management component;
- decrypting, by the key management component using a private key S1, the e-tkey to obtain the key tkey, and storing a combination of the virtual machine unique identifier uuid and the key tkey to disk using a sealed key K, where
- the sealed key K is derived by the TEE for the key management component, and is bound to a key management component measurement value kms-hash;
- upon restart of a virtual machine, requesting, by a virtual machine agent, a key from the key management component using the virtual machine unique identifier uuid and a hardware report R1 including a virtual machine measurement value vm-hash and a virtual machine public key P2;
- verifying, by the key management component, trustworthiness of the hardware report R1 and the virtual machine; upon successful verification, obtaining the corresponding tkey using the sealed key K and the unique identifier uuid in the request, and encrypting the tkey using the virtual machine public key P2 to generate p-tkey for returning to the virtual machine agent;
- decrypting, by the virtual machine agent using a virtual machine private key S2, the p-tkey to obtain the key tkey; and
- obtaining, by the virtual machine agent using the key tkey, the access key, to enable the zero-trust application service. In this way, a trusted application can be launched through the above-mentioned mechanisms, and the corresponding service can be accessed without trusting any party. This method enables ordinary applications to achieve zero-trust operation.

In the zero-trust remote attestation service deployment system based on a CVM, the application service is a remote attestation service; and the application service virtual machine is configured to provide the zero-trust remote attestation service by utilizing the TEE and the key management component.

The key management component releases the key tkey only when the remote attestation service is verified to be trustworthy, enabling access to the sealed stored data. In other words, only an untampered remote attestation service can be used for remote attestation, thereby mitigating the risk of sensitive data being exposed due to attacks on the attestation service.

In the zero-trust remote attestation service deployment system based on a CVM, the virtual machine agent creates an encrypted disk after generating the encryption key tkey;

the virtual machine unique identifier uuid, a network address ip, a key management address kms-endpoint, and the key management component measurement value kms-hash are combined and hashed to generate config-hash;

a key dkey is derived with the config-hash and the tkey as parameters, and the key dkey is used as a key of the encrypted disk;

the access key api-key of the application service is stored in the encrypted disk, such that the tkey is associated with the access key of the application service; and the encrypted disk is used as a sole data storage disk of the application service.

In the zero-trust remote attestation service deployment system based on a CVM, both the key tkey and the key dkey are destroyed after restarting the application service virtual machine;

after the virtual machine agent decrypts the p-tkey using the virtual machine private key S2, to obtain the key tkey, the virtual machine unique identifier uuid, the network address ip, the key management address kms-endpoint, and the key management component measurement value kms-hash are combined and hashed to generate the config-hash; and the key dkey is regenerated with the config-hash and the tkey as parameters.

In the zero-trust remote attestation service deployment system based on a CVM, the key management component verifies the trustworthiness of the hardware report R1 and the virtual machine using the following method:

verifying authenticity of the hardware report R1 using a report verification certificate of the CVM; upon successful verification, extracting the virtual machine measurement value vm-hash from the hardware report R1, and comparing the virtual machine measurement value vm-hash with a pre-configured virtual machine measurement value vm-hash; if the values are consistent, determining that the verification succeeds; otherwise, determining that the verification fails.

In the zero-trust remote attestation service deployment system based on a CVM, the virtual machine measurement value vm-hash is configured during a system deployment stage; and the virtual machine measurement value vm-hash is obtained by measuring an application service virtual machine image and a virtual machine environment (kernel and firmware required for starting the virtual machine).

In the zero-trust remote attestation service deployment system based on a CVM, when remote attestation is required, the virtual machine agent obtains virtual machine configuration information vm.config that is pre-stored in a plaintext disk and includes the virtual machine unique identifier uuid, the network address ip, and the key management address kms-endpoint, and configures a network using the network address ip in the virtual machine; and the virtual machine configuration information is stored in the plaintext disk during a system deployment stage and is used to derive the key dkey.

In the zero-trust remote attestation service deployment system based on a CVM, the trustworthiness of the key management component running in the TEE is verified in the following method:

generating, by the key management component, a public-private key pair P1-S1 in the TEE in which the key management component runs, and generating a hardware report R2 that includes the public key P1 and the key management component measurement value kms-hash and that is signed using a TEE private key;

verifying, by the virtual machine agent (also using a verification certificate in the TEE), authenticity of the hardware report R2; and if the verification succeeds, determining whether the key management component measurement value kms-hash in the hardware report R2 is consistent with a pre-configured key management component measurement value kms-hash; and if yes, verifying that the key management component running in the TEE is trustworthy.

In the zero-trust remote attestation service deployment system based on a CVM, a system deployment stage includes a service initialization process:

creating, by a system administrator, a virtual disk for the virtual machine to serve as a plaintext disk;

storing virtual machine configuration information including the virtual machine unique identifier uuid, the network address ip, and the key management address kms-endpoint in the plaintext disk in a file format of vm.config;

creating, by the system administrator, a CVM instance using an application service virtual machine image;

after starting the application service virtual machine, reading, by the virtual machine agent, the virtual machine configuration information, configuring a network with the network address ip in the virtual machine configuration information, and obtaining a hardware report R3 of the key management component using the key management address kms-endpoint, where the hardware report R3 is signed using a private key derived directly from the chip within the TEE and includes the key management component measurement value kms-hash and the virtual machine measurement value vm-hash; and after the virtual machine agent obtains the hardware report R3, verifying authenticity of the hardware report R3 using a verification certificate of the TEE; upon confirming the authenticity, checking whether the measurement value kms-hash and the virtual machine measurement value vm-hash in the hardware report R3 are measurement values of a legitimate program; and if yes, storing, by the virtual machine agent, the measurement value kms-hash, to complete initialization. In this way, the key management component measurement value kms-hash is configured in the system deployment stage.

In the zero-trust remote attestation service deployment system based on a CVM, the system deployment stage further includes an application preparation process and a system preparation process, where the application preparation process includes:

11) creating a virtual machine root file system rootfs, disabling login access for all users, and preventing mounting or switching to another rootfs after starting;

12) packaging the application service, the virtual machine rootfs, and the virtual machine agent into an application service virtual machine image supporting Linux system startup (that is, the initrd image. Once this image is executed, the application service virtual machine is instantiated); and 13) measuring the application service virtual machine image using a measurement tool provided by the CVM in combination with the kernel and firmware required for starting the virtual machine, to obtain the virtual machine measurement value vm-hash; and the system preparation process includes:

21) measuring the key management component using a TEE measurement tool, to obtain the key management component measurement value kms-hash;

22) deriving, by the TEE, the sealed key K for the key management component, where the sealed key K has a binding relationship with the measurement value kms-hash; and 23) configuring, by a system administrator, the virtual machine measurement value vm-hash to the key management component, that is, configuring the virtual machine measurement value vm-hash in the system deployment stage, and after starting the key management component, providing the key management address kms-endpoint to the virtual machine agent for obtaining the hardware report R3.

The present disclosure has the following advantages:

1. The solution leverages the TEE technology to protect both application execution and storage in a zero-trust state. The key management component runs in the TEE, while the service application runs in the CVM. Encryption keys of the CVM are securely stored and efficiently accessed through the TEE technology and the proposed key management component, as well as operational methods. This approach enables a zero-trust service and effectively mitigates the risk of sensitive data theft caused by malicious software through memory scraping or code operation logic tampering.
2. The solution introduces a key management component with sealed storage functionality, which securely stores and distributes keys based on the hardware reports. This ensures that encryption keys of the CVM remain encrypted at all times and cannot be accessed manually. As a result, applications and services, such as remote attestation services, can operate securely and reliably without relying on any third manual party such as a system administrator or a host administrator, ensuring the integrity, authenticity, and confidentiality during application runtime, as well as confidentiality of persistent data.
3. The solution employs a read-only plaintext disk to manage non-confidential configuration information of the CVM. This ensures consistent CVM measurement values for the same application, simplifying key management in multi-instance scenarios. It enables the creation of multiple instances of the same application for different users, and each CVM instance has an independent encryption key. This design guarantees full isolation of runtime logic and data among multiple users on a single host.
4. The encryption key of the encrypted disk is bound to the configuration of the CVM through a key derivation process. By incorporating the hash value of the key management component, the solution prevents malicious users from forging the key management system or malicious applications to steal the key of the encrypted disk, thereby ensuring the security of the encrypted data disk.

DETAILED DESCRIPTION OF THE EMBODIMENTS

The present disclosure is further described in detail below with reference to accompanying drawings and specific examples.

Figure 1:
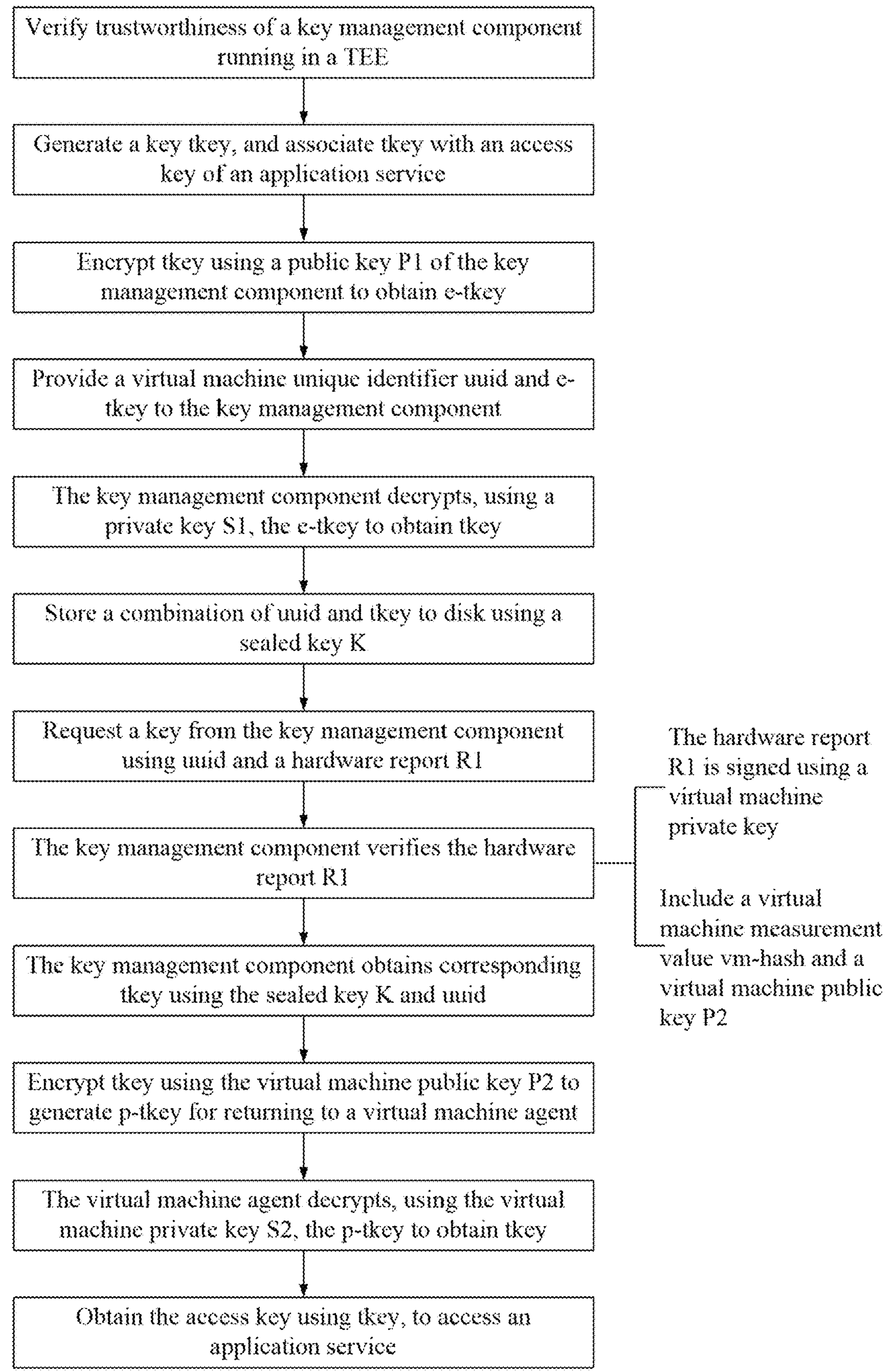
FIG. 1 is a flowchart of a method for implementing a zero-trust service according to the present disclosure.
Figure 2:
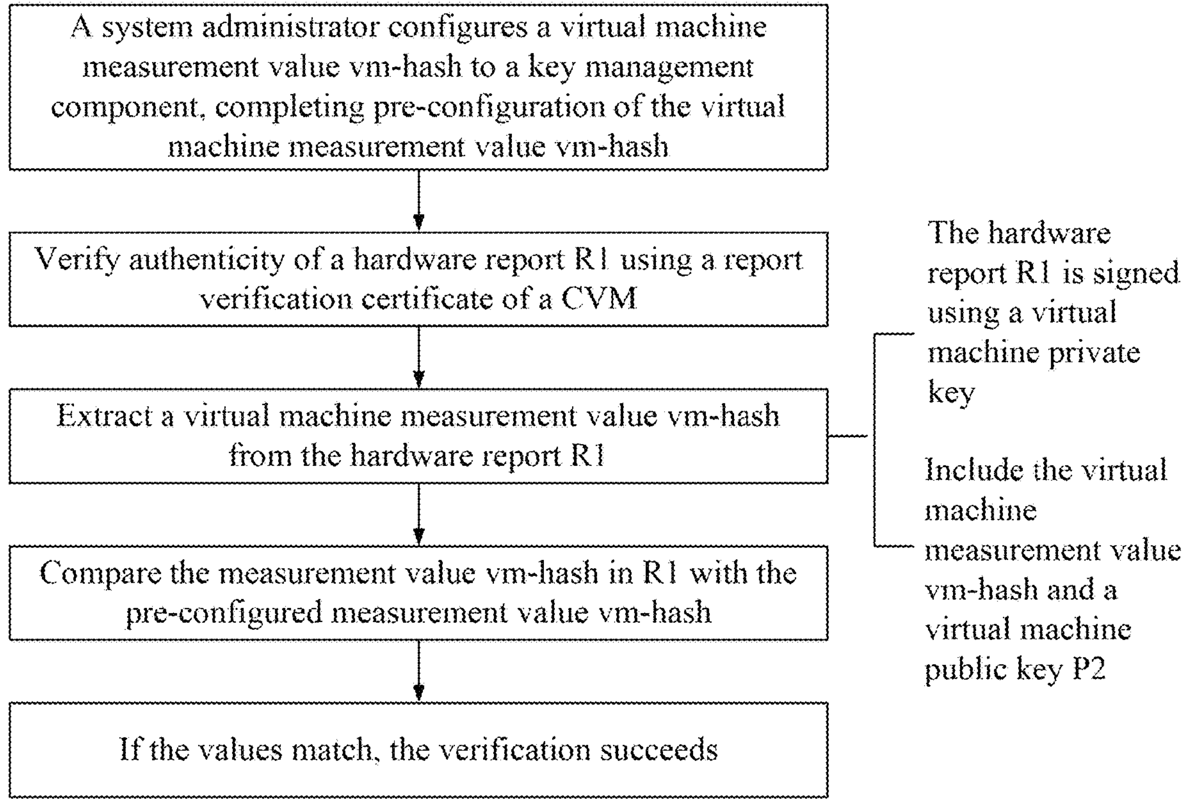
FIG. 2 is a principle diagram of a process in which a key management component verifies authenticity of a hardware report R1 in the method for implementing a zero-trust service according to the present disclosure.
Figure 3:
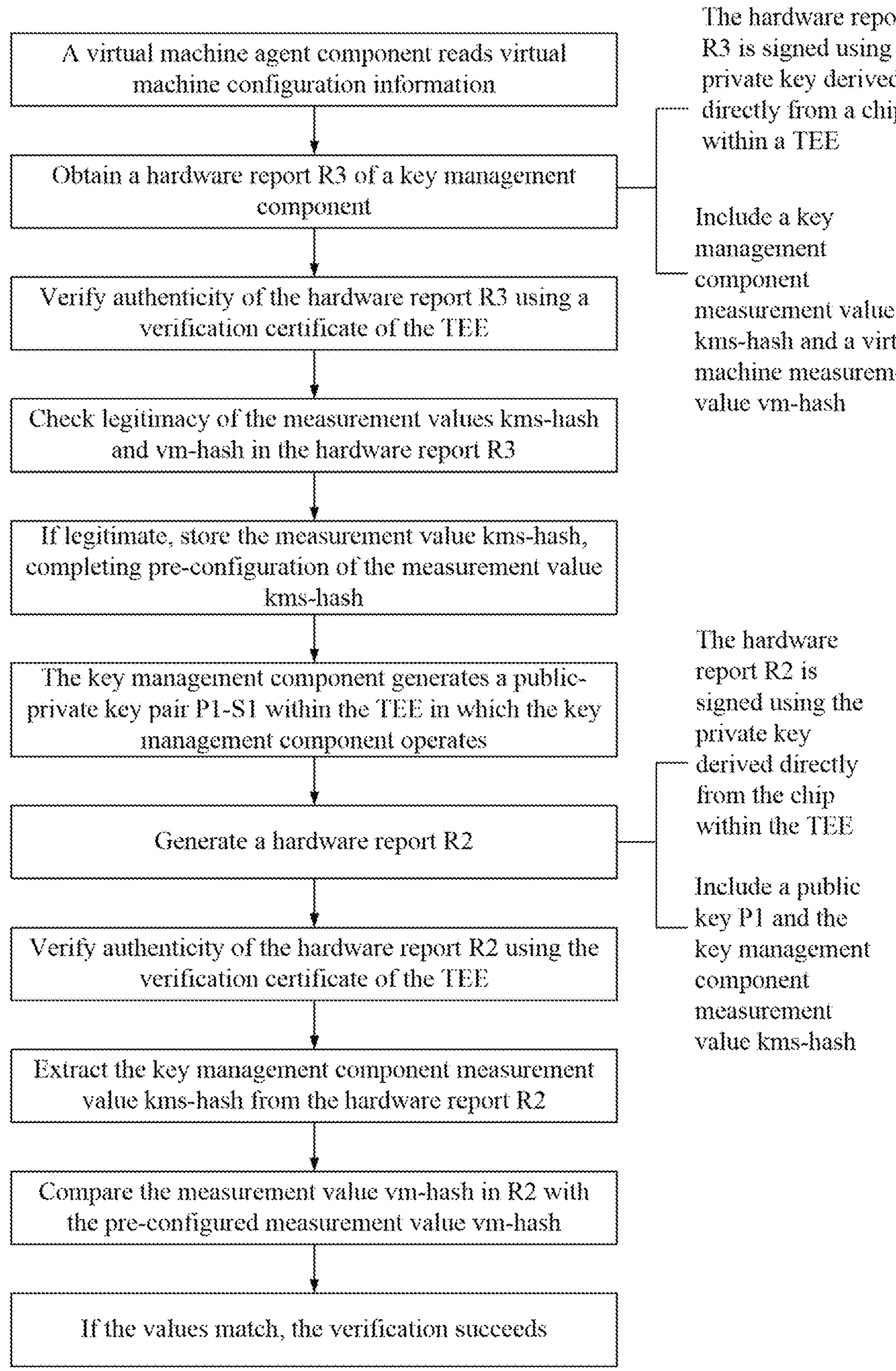
FIG. 3 is a principle diagram of a process of verifying trustworthiness of a key management component running in a TEE in the method for implementing a zero trust service according to the present disclosure.

The solution provides a zero-trust remote attestation service deployment system based on a CVM, including: a TEE, a key management component, and an application service virtual machine. The application service virtual machine is configured to provide a zero-trust application service by utilizing the TEE and the key management component. An implementation method is as shown in FIG. 1 to FIG. 3.

This embodiment takes a remote attestation service as an example of the application service and illustrates in detail the implementation and usage of the proposed solution from four stages during system deployment: service preparation, system preparation, service initialization, and system restart. It should be noted that the application program is not limited to remote attestation services.

A) The preparation process of the remote attestation service includes:

1) A Linux rootfs (referred to here as the virtual machine rootfs to distinguish from a standard rootfs) is created, login access is disabled for all users, and the virtual machine rootfs is prevented from mounting or switching to another rootfs after starting.

Figure 4:
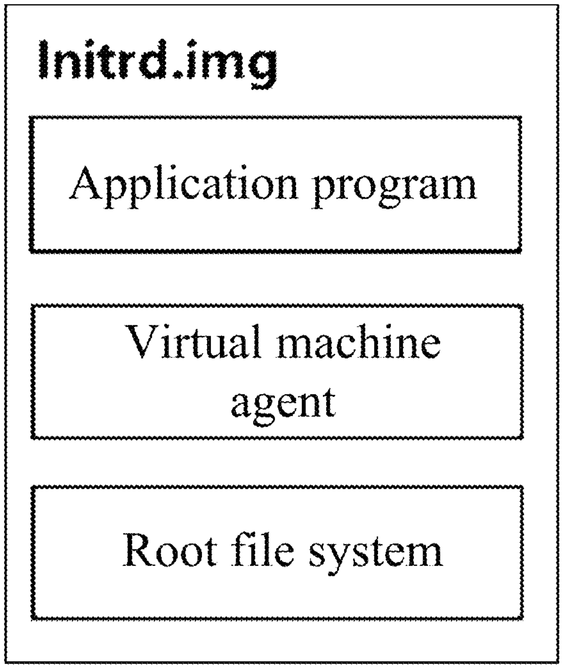
FIG. 4 is a schematic composition diagram of a virtual machine image for a remote attestation service according to the present disclosure.

2) As shown in FIG. 4, a program of the remote attestation service, the root file system (virtual machine rootfs), and a virtual machine agent are packaged into an initrd image supporting Linux system startup, that is, a remote attestation service virtual machine image.

3) The packaged initrd image is measured using a measurement tool provided by the CVM in combination with a kernel and firmware required for starting the virtual machine, to generate a virtual machine measurement value vm-hash. The kernel is the core component of the operating system, while the firmware acts as an interface between the hardware and the operating system. Measuring the initrd image together with the startup components ensures that the startup environment of the virtual machine is safe and not tampered with by the host or other virtual machines. This is used to ensure that the initrd image, kernel and firmware are not tampered with.

Figure 5:
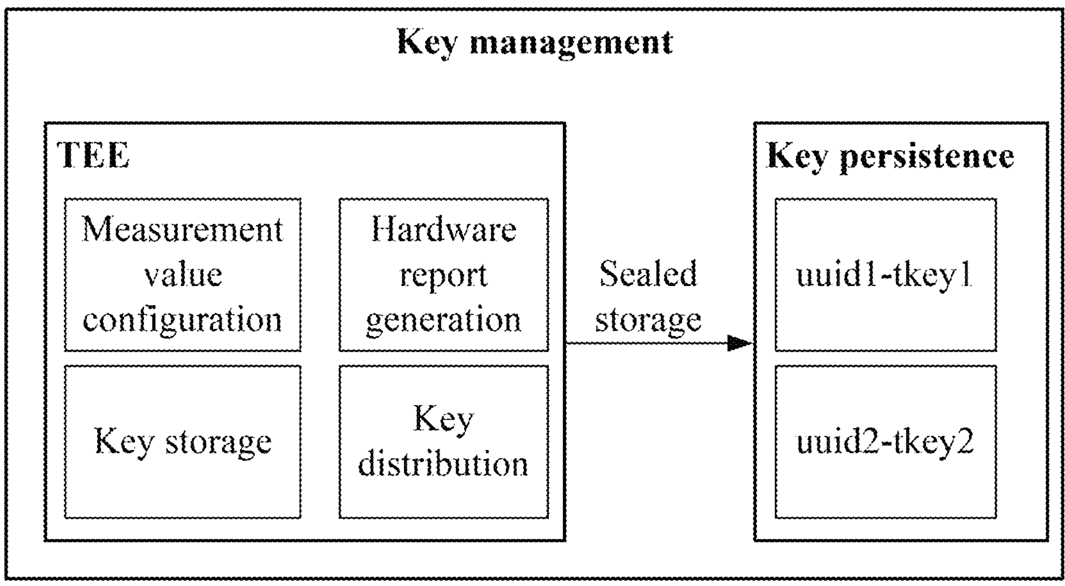
FIG. 5 shows a key management implementation method of a key management component according to the present disclosure.

B) As shown in FIG. 5, the system preparation process includes:

1) A key management component is deployed to run in the TEE, and the key management component is configured to provide the virtual machine with functions such as storing and distributing keys, configuring service measurement values, and generating hardware reports.
2) Prior to the operation of the key management component, a measurement tool provided by the TEE is used to measure the component, to obtain a key management component measurement value kms-hash.
3) The key management component is activated in the TEE, and the TEE loads a program into an encrypted memory during activation. The encrypted memory is provided on the basis of the capacity of the TEE, and a memory encryption key is only visible to a chip.
4) After the key management component is started, the TEE derives a sealed key K for the key management component and binds the sealed key K to the measurement value kms-hash, so as to encrypt and store an encryption key tkey of the virtual machine. The sealed key K is directly derived from the chip within the TEE and is bound to the kms-hash of the key management component, such that only the program corresponding to the kms-hash can obtain the correct sealed key K.
5) The system administrator configures a service measurement value vm-hash to the key management component. After the configuration is completed, the key management component officially enters a working state, and the service measurement value vm-hash cannot be changed any more.
6) After entering the working state, the key management component synchronizes the key management address kms-endpoint with the system administrator.

Figure 6:
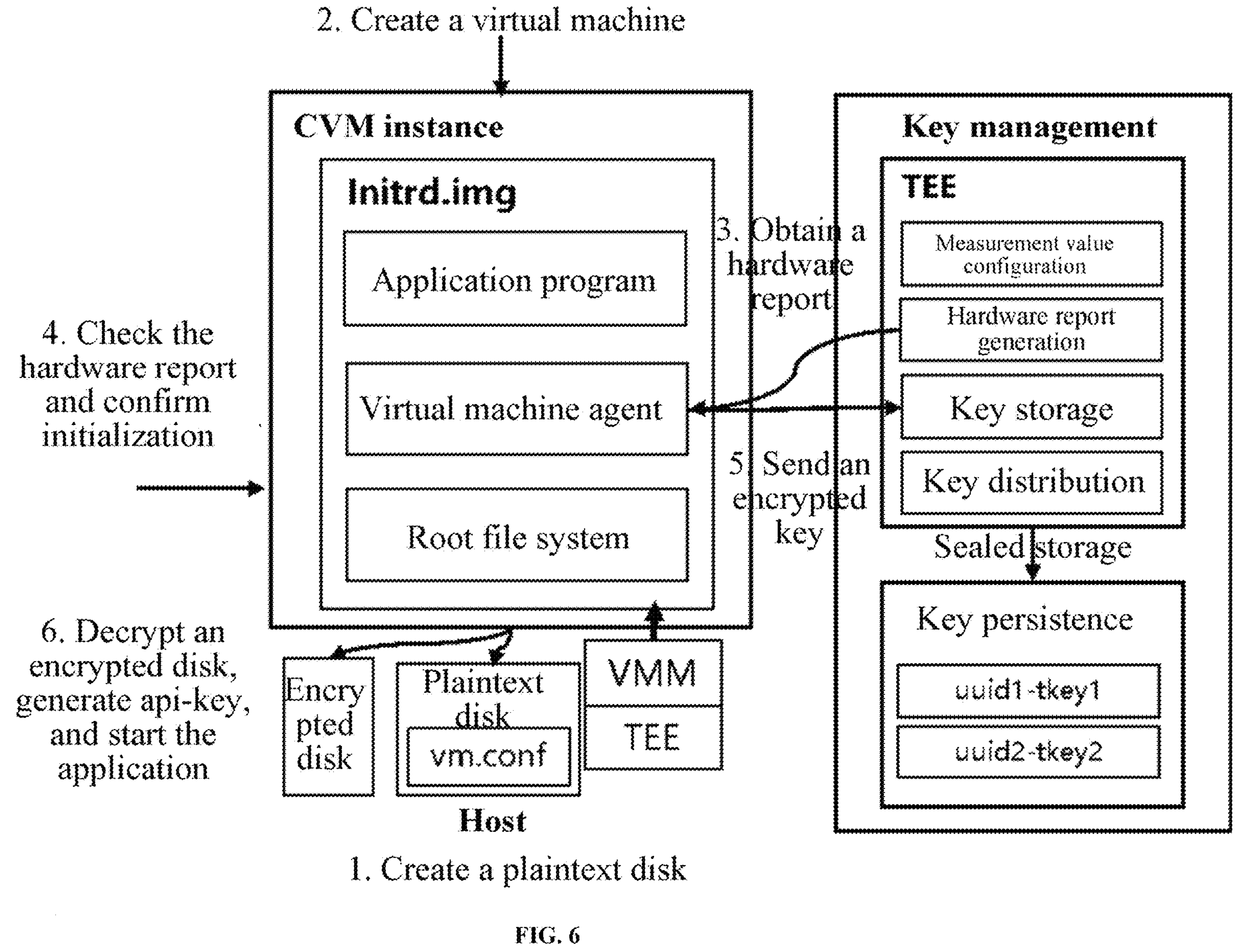
FIG. 6 is a framework diagram illustrating the principle of application initialization according to the present disclosure.

C) As shown in FIG. 6, the system initialization includes:

1) The system administrator creates a virtual disk for the virtual machine, referred to as the plaintext disk, and generates virtual machine configuration information, including a virtual machine unique identifier uuid, a network address ip, and the key management address kms-endpoint, and stores the information in the plaintext disk in a file format of vm.config.
2) The system administrator uses the initrd.img generated in the application preparation process to create a CVM instance, sets a startup mode of the virtual machine to kernel and initrd separation mode, mounts the plaintext disk in read-only mode, and mounts another virtual disk in read-write mode.
3) After the virtual machine system is started, a virtual machine agent reads vm.config, configures the network using the network address ip in the vm.config, and then obtains a hardware report R3 of the key management component via the key management address kms-endpoint. The hardware report R3 includes the key management component measurement value kms-hash and the virtual machine measurement value vm-hash, and is signed by a private key directly derived from the chip within the TEE.
4) After the virtual machine agent obtains the hardware report R3, the service administrator obtains the verification certificate of the TEE to verify the authenticity of the hardware report. Upon confirming the authenticity, the service administrator checks whether the kms-hash and the vm-hash in the hardware report R3 are measurement values of a legitimate program, that is, whether consistent with the kms-hash and vm-hash obtained during the remote attestation preparation process and the application preparation process; and if yes, the virtual machine agent temporarily stores the kms-hash and determines to initialize the service program.
5) After confirming the initialization, the virtual machine agent requests the key management component to store the key tkey. Upon receiving the request, the key management component generates a pair of temporary asymmetric encryption keys P1-S1 within the TEE in which the key management component operates, then generates a hardware report R2, embeds the public key P1 in the hardware report R2, and returns the hardware report R2 to the virtual machine agent after signing with the private key directly derived from the chip within the TEE. After receiving the hardware report R2, the virtual machine agent verifies the authenticity of the hardware report R2 using the verification certificate of the TEE, and checks whether the key management component measurement value kms-hash in the hardware report R2 is consistent with the pre-configured kms-hash; if yes, the virtual machine agent generates the encryption key tkey, encrypts the tkey using the public key P1 embedded in the hardware report R2, to obtain e-tkey, and sends the uuid and e-tkey to the key management component. The key management component decrypts e-tkey using the private key S1, to obtain the tkey, and stores a combination of the uuid and tkey in a sealed manner to disk using the sealed key K.
6) The virtual machine agent combines the virtual machine unique identifier uuid, the network address ip, the key management address kms-endpoint, and the key management component measurement value kms-hash and calculates a hash value using the SHA256 algorithm, that is, SHA256 (uuid+ip+kms-endpoint+kms-hash)=config-hash. Subsequently, dkey is derived using the HMAC-SHA256 algorithm, with config-hash and tkey as parameters. Then, the virtual machine agent creates an encrypted disk, sets the key of the encrypted disk as dkey, stores the dkey in memory for encrypting and decrypting stored data, and stores uuid in the plaintext disk for subsequent key retrieval. Finally, an api-key is randomly generated as the access key of the service program, and stored in the encrypted disk, and the remote attestation service program is started, using the encrypted disk as the sole data storage disk of the program of the remote attestation service.

This method employs the plaintext disk and ciphertext disk, and multiple instances supporting the same remote attestation service are created through the plaintext disk. Multiple users can create and use the same remote attestation service, and different instances generate different tkey and api-key to achieve independent encryption, thereby ensuring complete isolation among instances and enabling expansion to all service providers.

Figure 7:
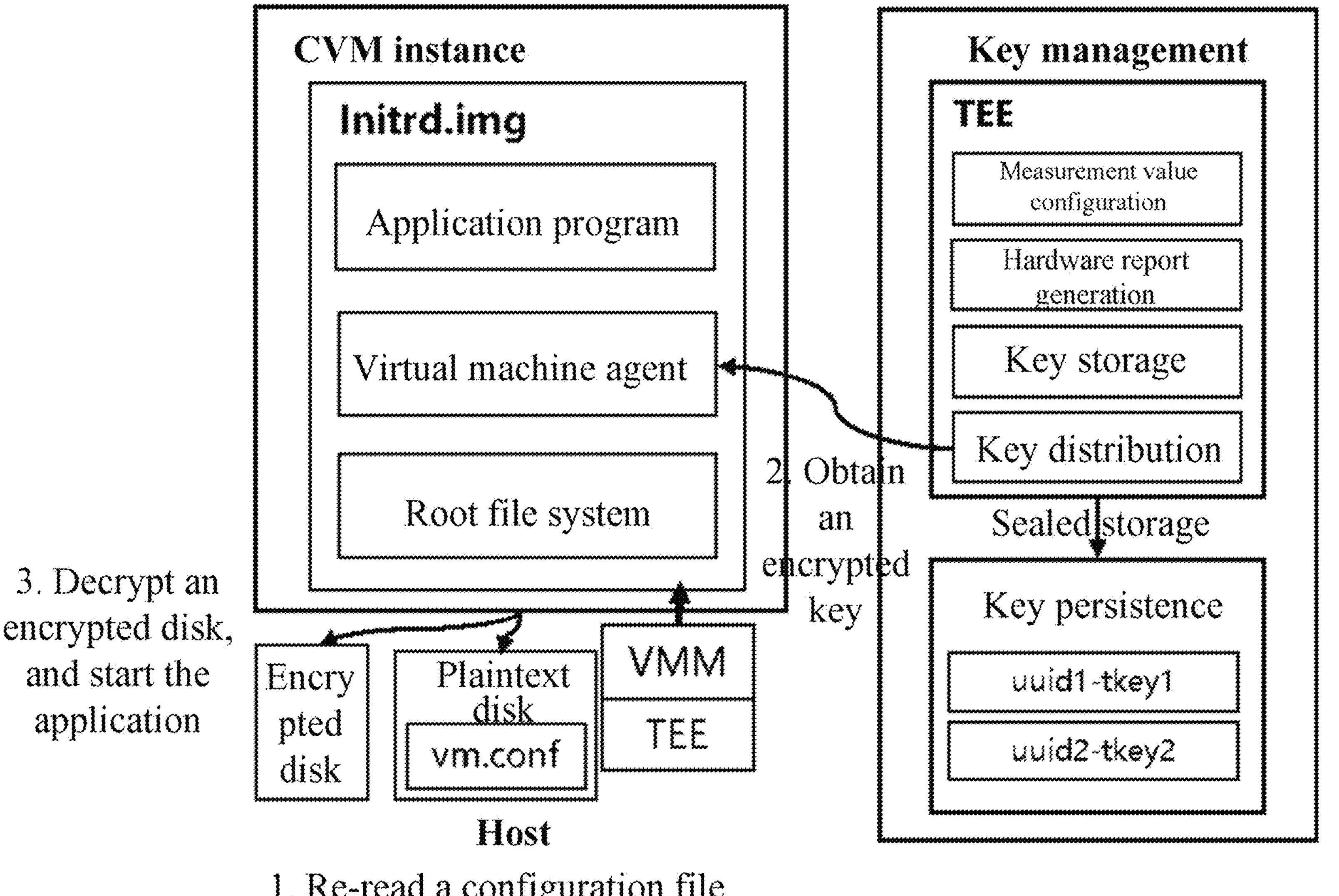
FIG. 7 is a framework diagram illustrating the principle of application restart when a virtual machine restarts.

D) As shown in FIG. 7, the service restart includes:

Service restart refers to the process of restarting the service after a virtual machine is restarted. The keys dkey and tkey are stored in the memory, which are destroyed after restarting the virtual machine. Therefore, it is necessary to retrieve these keys again to enable normal access to data stored on the encrypted disk. The core step following the service restart is thus to retrieve the key dkey.

1) The virtual machine agent re-reads the unique identifier uuid, the network address ip, and the key management address kms-endpoint from vm.config, and reconfigures the network using the network address ip.

2) The virtual machine agent generates a temporary public-private key pair P2-S2, then generates a hardware report R1 including the measurement value vm-hash, and embeds the public key information P2 in the hardware report R1. The hardware report R1 and the uuid are then used as parameters to request the key from the key management component. Upon receiving the request, the key management component verifies the authenticity of the hardware report R1 using the report verification certificate of the CVM. If the verification succeeds, the vm-hash is extracted from the hardware report R1 and compared with the vm-hash configured during initialization of the key management component. If the values are consistent, the corresponding tkey is obtained using the uuid, and encrypted using the public key extracted from the report, to generate p-tkey, and p-tkey is sent to the virtual machine agent. After obtaining the p-tkey, the virtual machine agent decrypts the p-tkey using the private key S2, to obtain the tkey.

3) The virtual machine agent combines the virtual machine unique identifier uuid, the network address ip, the key management address kms-endpoint, and the key management component measurement value kms-hash and calculates a hash value using the SHA256 algorithm, that is, SHA256 (uuid+ip+kms-endpoint+kms-hash)=config-hash. Subsequently, dkey is derived using the HMAC-SHA256 algorithm, with config-hash and tkey as parameters, to decrypt the encrypted disk, after which the service program is restarted.

Through the above method, the trustworthiness of the restarted remote attestation service, the trustworthiness of the utilized data, and the security of the stored data can all be assured. This enables the zero-trust remote attestation service based on a CVM, capable of running securely and reliably without relying on any third manual party such as the system administrator or the host administrator, ensuring the integrity, authenticity, and confidentiality during application runtime, as well as confidentiality of the persistent data. Other application services follow a similar process to that of the remote attestation service, and therefore are not described in detail herein.

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

What is claimed is:

1. A zero-trust remote attestation service deployment method based on a confidential virtual machine (CVM), comprising:

verifying trustworthiness of a key management component running in a trusted execution environment (TEE);

upon successful verification, generating a key tkey, and associating the key tkey with an access key of a zero-trust application service;

encrypting the key tkey using a public key P1 of the key management component to obtain e-tkey;

providing a virtual machine unique identifier uuid and the e-tkey to the key management component;

decrypting, by the key management component using a private key S1, the e-tkey to obtain the key tkey, and storing a combination of the virtual machine unique identifier uuid and the key tkey to disk using a sealed key K, wherein the sealed key K is derived by the TEE for the key management component, and is bound to a key management component measurement value kms-hash;

upon restart of a virtual machine, requesting, by a virtual machine agent, a key from the key management component using the virtual machine unique identifier uuid and a hardware report R1 comprising a virtual machine measurement value vm-hash and a virtual machine public key P2;

verifying, by the key management component, trustworthiness of the hardware report R1 and the virtual machine; upon successful verification, obtaining the corresponding tkey using the sealed key K and the unique identifier uuid in the request, and encrypting the tkey using the virtual machine public key P2 to generate p-tkey for returning to the virtual machine agent;

decrypting, by the virtual machine agent using a virtual machine private key S2, the p-tkey to obtain the key tkey; and obtaining, by the virtual machine agent using the key tkey, the access key, to enable the zero-trust application service.

2. The zero-trust remote attestation service deployment method based on the CVM according to claim 1, wherein the zero-trust application service is a zero-trust remote attestation service; and the method further comprises providing, through a application service virtual machine, the zero-trust remote attestation service by utilizing the TEE and the key management component.

3. The zero-trust remote attestation service deployment method based on the CVM according to claim 2, wherein the virtual machine agent creates an encrypted disk after generating the encryption key tkey;

the virtual machine unique identifier uuid, a network address ip, a key management address kms-endpoint, and the key management component measurement value kms-hash are combined and hashed to generate config-hash;

a key dkey is derived with the config-hash and the tkey as parameters, and the key dkey is used as a key of the encrypted disk;

the access key of the zero-trust application service is stored in the encrypted disk, such that the tkey is associated with the access key of the zero-trust application service; and the encrypted disk is used as a data storage disk of the zero-trust application service.

4. The zero-trust remote attestation service deployment method based on the CVM according to claim 3, wherein the key tkey and the key dkey are destroyed after restarting the application service virtual machine;

after the virtual machine agent decrypts the p-tkey using the virtual machine private key S2 to obtain the key tkey, the virtual machine unique identifier uuid, the network address ip, the key management address kms-endpoint, and the key management component measurement value kms-hash are combined and hashed to generate the config-hash; and the key dkey is regenerated with the config-hash and the tkey as the parameters.

5. The zero-trust remote attestation service deployment method based on the CVM according to claim 4, wherein the virtual machine measurement value vm-hash is configured during a system deployment stage; and the virtual machine measurement value vm-hash is obtained by measuring an application service virtual machine image and a virtual machine environment.

6. The zero-trust remote attestation service deployment method based on the CVM according to claim 3, wherein the key management component verifies the trustworthiness of the hardware report R1 and the virtual machine using the following method:

verifying authenticity of the hardware report R1 using a report verification certificate of the CVM; upon successful verification, extracting the virtual machine measurement value vm-hash from the hardware report R1, and comparing the virtual machine measurement value vm-hash with a pre-configured virtual machine measurement value vm-hash; when the virtual machine measurement value vm-hash and the pre-configured virtual machine measurement value vm-hash are consistent, determining that the verification succeeds; when the virtual machine measurement value vm-hash and the pre-configured virtual machine measurement value vm-hash are not consistent, determining that the verification fails.

7. The zero-trust remote attestation service deployment method based on the CVM according to claim 6, wherein when remote attestation is required, the virtual machine agent obtains virtual machine configuration information pre-stored in a plaintext disk and comprising the virtual machine unique identifier uuid, the network address ip and the key management address kms-endpoint, and the virtual machine agent configures a network using the network address ip in the virtual machine configuration information; and the virtual machine configuration information is stored in the plaintext disk during a system deployment stage and is used to derive the key dkey.

8. The zero-trust remote attestation service deployment method based on the CVM according to claim 3, wherein the trustworthiness of the key management component running in the TEE is verified in the following method:

generating, by the key management component, a public-private key pair P1-S1 in the TEE, and generating a hardware report R2, wherein the hardware report R2 comprises the public key P1 and the key management component measurement value kms-hash and is signed using a TEE private key;

verifying, by the virtual machine agent, authenticity of the hardware report R2; and when the verification succeeds, determining whether the key management component measurement value kms-hash in the hardware report R2 is consistent with a pre-configured key management component measurement value kms-hash; and when the key management component measurement value kms-hash in the hardware report R2 is consistent with the pre-configured key management component measurement value kms-hash, verifying that the key management component running in the TEE is trustworthy.

9. The zero-trust remote attestation service deployment method based on the CVM according to claim 1, wherein the virtual machine agent creates an encrypted disk after generating the encryption key tkey;

the virtual machine unique identifier uuid, a network address ip, a key management address kms-endpoint, and the key management component measurement value kms-hash are combined and hashed to generate config-hash;

a key dkey is derived with the config-hash and the tkey as parameters, and the key dkey is used as a key of the encrypted disk;

the access key of the zero-trust application service is stored in the encrypted disk, such that the tkey is associated with the access key of the zero-trust application service; and the encrypted disk is used as a data storage disk of the zero-trust application service.

10. The zero-trust remote attestation service deployment method based on the CVM according to claim 9, wherein the key tkey and the key dkey are destroyed after restarting the application service virtual machine;

after the virtual machine agent decrypts the p-tkey using the virtual machine private key S2 to obtain the key tkey, the virtual machine unique identifier uuid, the network address ip, the key management address kms-endpoint, and the key management component measurement value kms-hash are combined and hashed to generate the config-hash; and the key dkey is regenerated with the config-hash and the tkey as the parameters.

11. The zero-trust remote attestation service deployment method based on the CVM according to claim 10, wherein the virtual machine measurement value vm-hash is configured during a system deployment stage; and the virtual machine measurement value vm-hash is obtained by measuring an application service virtual machine image and a virtual machine environment.

12. The zero-trust remote attestation service deployment method based on the CVM according to claim 9, wherein the key management component verifies the trustworthiness of the hardware report R1 and the virtual machine using the following method:

verifying authenticity of the hardware report R1 using a report verification certificate of the CVM; upon successful verification, extracting the virtual machine measurement value vm-hash from the hardware report R1, and comparing the virtual machine measurement value vm-hash with a pre-configured virtual machine measurement value vm-hash; when the virtual machine measurement value vm-hash and the pre-configured virtual machine measurement value vm-hash are consistent, determining that the verification succeeds; when the virtual machine measurement value vm-hash and the pre-configured virtual machine measurement value vm-hash are not consistent, determining that the verification fails.

13. The zero-trust remote attestation service deployment method based on the CVM according to claim 12, wherein when remote attestation is required, the virtual machine agent obtains virtual machine configuration information pre-stored in a plaintext disk and comprising the virtual machine unique identifier uuid, the network address ip and the key management address kms-endpoint, and the virtual machine agent configures a network using the network address ip in the virtual machine configuration information; and the virtual machine configuration information is stored in the plaintext disk during a system deployment stage and is used to derive the key dkey.

14. The zero-trust remote attestation service deployment method based on the CVM according to claim 9, wherein the trustworthiness of the key management component running in the TEE is verified in the following method:

generating, by the key management component, a public-private key pair P1-S1 in the TEE, and generating a hardware report R2, wherein the hardware report R2 comprises the public key P1 and the key management component measurement value kms-hash and is signed using a TEE private key;

verifying, by the virtual machine agent, authenticity of the hardware report R2; and when the verification succeeds, determining whether the key management component measurement value kms-hash in the hardware report R2 is consistent with a pre-configured key management component measurement value kms-hash; and when the key management component measurement value kms-hash in the hardware report R2 is consistent with the pre-configured key management component measurement value kms-hash, verifying that the key management component running in the TEE is trustworthy.

15. The zero-trust remote attestation service deployment method based on the CVM according to claim 1, wherein a system deployment stage comprises a service initialization process:

creating, by a system administrator, a virtual disk for the virtual machine to serve as a plaintext disk;

storing virtual machine configuration information comprising the virtual machine unique identifier uuid, a network address ip, and a key management address kms-endpoint in the plaintext disk in a file format of vm.config;

creating, by the system administrator, a CVM instance using an application service virtual machine image;

after starting the application service virtual machine, reading, by the virtual machine agent, the virtual machine configuration information, configuring a network with the network address ip in the virtual machine configuration information, and obtaining a hardware report R3 of the key management component using the key management address kms-endpoint, wherein the hardware report R3 is signed using a private key derived directly from a chip within the TEE and comprises the key management component measurement value kms-hash and the virtual machine measurement value vm-hash; and after the virtual machine agent obtains the hardware report R3, verifying authenticity of the hardware report R3 using a verification certificate of the TEE; upon confirming the authenticity, checking whether the key management component measurement value kms-hash and the virtual machine measurement value vm-hash in the hardware report R3 are measurement values of a legitimate program; and when the key management component measurement value kms-hash and the virtual machine measurement value vm-hash in the hardware report R3 are measurement values of the legitimate program, storing, by the virtual machine agent, the key management component measurement value kms-hash.

16. The zero-trust remote attestation service deployment method based on the CVM according to claim 15, wherein the system deployment stage further comprises an application preparation process and a system preparation process, wherein the application preparation process comprises:

11) creating a virtual machine root file system rootfs, disabling login access for all users, and preventing mounting or switching to another rootfs after starting;

12) packaging the zero-trust application service, the virtual machine root file system rootfs, and the virtual machine agent into an application service virtual machine image supporting Linux system startup; and 13) measuring the application service virtual machine image using a measurement tool provided by the virtual machine in combination with a kernel and firmware required for starting the virtual machine, to obtain the virtual machine measurement value vm-hash; and the system preparation process comprises:

21) measuring the key management component using a TEE measurement tool, to obtain the key management component measurement value kms-hash;

22) deriving, by the TEE, the sealed key K for the key management component, wherein the sealed key K has a binding relationship with the key management component measurement value kms-hash; and 23) configuring, by a system administrator, the virtual machine measurement value vm-hash to the key management component, and providing, by the key management component, the key management address kms-endpoint to the virtual machine agent for obtaining a hardware report R3.

* * * * *